United States Patent
Chiu

(10) Patent No.: US 7,123,896 B2
(45) Date of Patent: Oct. 17, 2006

(54) METHOD AND APPARATUS FOR I/Q MISMATCH CALIBRATION IN A RECEIVER

(75) Inventor: Mao-Ching Chiu, Hsinchu (TW)

(73) Assignee: Mediatek Inc., Hsin-Chu (TW)

(*) Notice: Subject to any disclaimer, the term of this patent is extended or adjusted under 35 U.S.C. 154(b) by 491 days.

(21) Appl. No.: 10/628,165

(22) Filed: Jul. 28, 2003

(65) Prior Publication Data

US 2005/0026577 A1 Feb. 3, 2005

(51) Int. Cl.
*H04B 1/26* (2006.01)
(52) U.S. Cl. .............. 455/313; 455/334; 375/316
(58) Field of Classification Search ......... 455/313, 455/334; 375/316
See application file for complete search history.

(56) References Cited

U.S. PATENT DOCUMENTS 5,949,821 A * 9/1999 Emami et al. ............ 375/235
6,122,325 A * 9/2000 Mogre et al. ............ 375/261
6,330,290 B1 * 12/2001 Glas ....................... 375/324
2003/0095589 A1 * 5/2003 Jeong ..................... 375/147
2005/0047536 A1 * 3/2005 Wu et al. ................. 375/346

* cited by examiner

*Primary Examiner*—Quochien B. Vuong
*Assistant Examiner*—Christian A. Hannon
(74) *Attorney, Agent, or Firm*—Thomas, Kayden, Horstemeyer & Risley

(57) ABSTRACT

A method for I/Q mismatch calibration in a receiver. The receiver has an I/Q correction module using parameters $A_p$ and $B_p$. The method comprises the steps of generating an analog test signal x(t), applying I/Q demodulation to reduce the central frequency of the signal x(t) by $f_c$ Hz and outputting a demodulated signal $x_{dem}(t)$, converting the analog signal $x_{dem}(t)$ to a digital signal $x_{dem}[n]$, sending the signal $x_{dem}[n]$ into the I/Q correction module using parameters $A_p$ and $B_p$ and outputting a corrected signal w[n], obtaining two measures $U_1$ and $U_2$ of the corrected signal w[n], and updating the parameters $A_p$ and $B_p$ of the I/Q correction module respectively by a first and second function of the two measures $U_1$ and $U_2$, and the current values of the parameters $A_p$ and $B_p$.

10 Claims, 4 Drawing Sheets

METHOD AND APPARATUS FOR I/Q MISMATCH CALIBRATION IN A RECEIVER

BACKGROUND OF THE INVENTION

1. Field of the Invention

The present invention relates to compensation of physical layer impairments on communication systems and particularly to a method and apparatus for I/Q mismatch calibration in a receiver.

2. Description of the Prior Art

OFDM is a multi-channel modulation system employing Frequency Division Multiplexing (FDM) of orthogonal sub-carriers, each modulating a low bit-rate digital stream. The simplest way to describe an orthogonal frequency-division multiplexing (OFDM) signal is as a set of closely spaced frequency-division multiplexed carriers. While this is a good starting point for those unfamiliar with the technology, it falls short as a model for analyzing the effects of signal impairment.

The reason it falls short is that the carriers are more than closely spaced; they are heavily overlapped. In a perfect OFDM signal, the orthogonality property prevents interference between overlapping carriers. This is different from the FDM systems. In FDM systems, any overlap in the spectrums of adjacent signals will result in interference. In OFDM systems, the carriers will interfere with each other only if there is a loss of orthogonality. So long as orthogonality can be maintained, the carriers can be heavily overlapped, allowing increased spectral efficiency.

Table 1 lists a variety of common analog signal impairments and their effects on both OFDM signals and the more familiar single-carrier modulations such as quadrature phase-shift keying (QPSK) or 64-QAM (quadrature amplitude modulation). Most of these impairments can occur in either the transmitter or the receiver.

| Impairment | OFDM | QPSK |
|---|---|---|
| I/Q gain balance | State spreading (uniform/carrier) | Distortion of constellation |
| I/Q quadrature skew | State spreading (uniform/carrier) | Distortion of constellation |
| I/Q channel mismatch | State spreading (non-uniform/carrier) | State spreading |
| Uncompensated frequency error | State spreading | Spinning constellation |
| Phase noise | State spreading (uniform/carrier) | Constellation phase arcing |
| Nonlinear distortion | State spreading | State spreading |
| Linear distortion | Usually no effect (equalized) | State spreading if not equalized |
| Carrier leakage | Offset constellation for center carrier only (if used) | Offset constellation |
| Frequency error | State spreading | Constellation phase arcing |
| Amplifier droop | Radial constellation distortion | Radial constellation distortion |
| Spurious | State spreading or shifting of affected sub-carrier | State spreading, generally circular |

For cost reasons, analog in-phase and quadrature (I/Q) modulators and demodulators are often used in transceivers—especially for wide bandwidth signals. Being analog, these I/Q modulators and demodulators usually have imperfections that result in an imperfect match between the two baseband analog signals, I and Q, which represent the complex carrier. For example, gain mismatch might cause the I signal to be slightly different from the Q. In a single-carrier modulation system, this results in a visible distortion in the constellation—the square constellation of a 64-QAM signal would become rectangular.

To better understand how gain imbalance will affect an OFDM signal, look at the equations describing each individual sub-carrier. In the following analysis, it's important to keep in mind that, while an individual sub-carrier is analyzed, the I/Q gain imbalance error is on the signal that is the composite of all sub-carriers.

In the equation (1), $C_{k,m}$ is a complex number representing the location of the symbol within the constellation for the kth sub-carrier at the mth symbol time. For example, if sub-carrier k is binary-phase-shift-keying (BPSK) modulated, then $C_{k,m}$ might take on values of ±1+j0. The complex exponential portion of equation (1) represents the kth sub-carrier, which is amplitude- and phase-modulated by the symbol $C_{k,m}$. Therefore:

$$C_{k,m}(e^{j2\pi k\Delta ft}) \qquad (1)$$

Using Euler's relation, the equation (1) can be rewritten as:

$$C_{k,m}(\cos(2\pi \cdot k\Delta ft)+j\sin(2\pi \cdot k\Delta ft)) \qquad (2)$$

Now add the term "β" to represent gain imbalance. For a perfect signal, set β=0. As shown, the gain imbalance term will also produce a gain change. This was done to simplify the analysis. Therefore:

$$C_{k,m}((1+\beta)\cos(2\pi \cdot k\Delta ft)+j\sin(2\pi \cdot k\Delta ft)) \qquad (3)$$

The equation can be rearranged and this can be rewritten as the sum of a perfect signal and an error signal:

$$C_{k,m}(\cos(2\pi \cdot k\Delta ft)+j\sin(2\pi \cdot k\Delta ft))+C_{k,m}\beta\cos(2\pi \cdot k\Delta ft) \qquad (4)$$

Finally, converting back into complex exponential notation, we get:

$$C_{k,m}e^{j2\pi k\Delta ft} + \left(C_{k,m}\frac{\beta}{2}\right)\cdot(e^{j2\pi k\Delta ft}+e^{-j2\pi k\Delta ft}) \qquad (5)$$

In words, the equation (5) shows that a gain imbalance produces two error terms. The first error term is at the frequency of the kth sub-carrier. The second error term is at the frequency of the –kth sub-carrier. The phase and magnitude of the error terms are proportional to the symbol being transmitted on the kth sub-carrier. Another way of saying this is that I/Q gain imbalance will result in each sub-carrier being interfered with by its frequency mirror-image sub-carrier. Persons skilled in the art will instantly recognize this as imperfect sideband cancellation.

The equation (5) has several implications. First, it is generally true that for sub-carriers used to carry data (as opposed to pilots), the symbol being transmitted at any given time on the kth sub-carrier is uncorrelated to the symbol on the –kth sub-carrier.

For a given sub-carrier, the lack of correlation from the mirror-image sub-carrier implies a certain randomness to the error. This results in a spreading of the sub-carrier's constellation states in a noise-like fashion. This is especially true for higher-order modulations such as 64-QAM. For lower-order modulations, such as BPSK, the error term from the mirror-image carrier has fewer states.

This can result in constellations where the BPSK pilot carriers of an 802.11a signal exhibit spreading that does not appear noise-like. Also, as the BPSK pilots do not have an imaginary component; the error terms associated with the pilot sub-carriers are real—so the spreading is only along the real (I) axis. Note that the phase relationships between the pilot carriers in an 802.11a system are highly correlated, so the errors introduced by quadrature errors are not random.

Quadrature skew produces error terms similar to those produced by gain imbalance. Quadrature skew occurs when the two oscillators used in an I/Q modulator or demodulator do not differ by exactly 90°. For a small angular error, it can be shown that the resulting error is orthogonal to the data. This is indicated by the j in front of the error terms in the equation (6). As with gain imbalance, the error generates energy at the kth and –kth sub-carriers. Again, the 802.11a BPSK pilots do not have an imaginary component, so the error term, which is now orthogonal, causes spreading along the Q axis. For the QPSK carriers in this example, the error is also orthogonal. However, unlike BPSK, a QPSK constellation doesn't look any different when rotated by 90°. (See the equation (6).):

$$C_{k,m} e^{j2\pi k \Delta ft} + j \frac{C_{k,m} \phi}{2} \cdot (e^{j2\pi k \Delta ft} + e^{-j2\pi k \Delta ft}) \quad (6)$$

In both 802.11a and Hiperlan2, a channel estimation sequence is transmitted at the beginning of a burst. This special sequence is used to train the receiver's equalizer. The intended function of the equalizer is to compensate the received signal for multi-path distortion—a linear impairment in the signal that is the result of multiple signal paths between the transmitter and the receiver. As the ideal channel estimation sequence is known by the receiver, the receiver can observe the effects of the channel on the transmitted signal and compute a set of equalizer coefficients.

In the transmitter, the channel estimation sequence is created by BPSK modulating all 52 carriers for a portion of the preamble. Not coincidentally, the equalizer consists of 52 complex coefficients—one for each sub-carrier. It should come as no surprise that each sub-carrier in the channel estimation sequence has the greatest influence on the equalizer coefficient computed for that same sub-carrier.

The channel estimation sequence, and the receiver algorithms that compute the equalizer coefficients, are not immune from signal impairments. Consider, for example, the effect of I/Q gain imbalance on sub-carriers +26 and –26 of the channel estimation sequence. Recall from equation (5) that each sub-carrier has two error terms: one at the same frequency as the sub-carrier, and one at the mirror image frequency. The I/Q gain imbalance will cause mutual interference between sub-carriers +26 and –26.

From the IEEE 802.11a standard, the sub-carrier modulation for the channel estimation sequence is defined to be $C_{-26}=1+j0$ and $C_{+26}=1+j0$. Using these values in equation (5), one can easily determine that the two sub-carriers, when combined with the resulting error terms, will suffer an increase in amplitude. The equalizer algorithm will be unable to differentiate the error from the actual channel response, and will interpret this as a channel with too much gain at these two sub-carrier frequencies. The equalizer will incorrectly attempt to compensate by reducing the gain on these sub-carriers for subsequent data symbols.

The result will be different for other sub-carrier pairs, depending on the BPSK channel estimation symbols assigned to each.

With QPSK sub-carriers, the equalizer error caused by gain imbalance, or quadrature skew, results in seven groupings in each corner. Each QPSK sub-carrier suffers from QPSK interference from its mirror image. This results in a spreading to four constellation points in each corner. Each QPSK sub-carrier also suffers from a bi-level gain error introduced by the equalizer. This would produce eight groupings, except that the gain error is such that corners of the groupings overlap at the ideal corner state. Only seven groupings are visible.

I/Q Channel Mismatch

When the frequency response of the baseband I and Q channel signal paths are different, an I/Q channel mismatch exists. I/Q channel mismatch can be modeled as a sub-carrier-dependent gain imbalance and quadrature skew. I/Q gain imbalance and quadrature skew, as described above, are simply a degenerate form of I/Q channel mismatch in which the mismatch is constant over all sub-carriers. Think of channel mismatch as gain imbalance and quadrature skew as a function of a sub-carrier. It is still generally true that channel mismatch causes interaction between the kth and –kth sub-carriers, but that the magnitude of the impairment could differ between the kth and the (k+n)th carriers.

Delay mismatch is a distinct error. It can occur when the signal path for the I signal differs in electrical length from the Q signal. This can be caused by different cable lengths (or traces), timing skew between D/A converters used to generate the I and Q signals, or group delay differences in filters in the I and Q signal paths.

What makes this error distinctive is that the error is greater for the outer carriers than it is for the inner carriers. In other words, the error increases with distance from the center sub-carrier. With a vector spectrum display, it may be shown that the signal error is a function of the sub-carrier number (frequency). That is to say, the phase arcing may occur as a function of frequency.

In order to eliminate the effects of the previously described impairments on the OFDM systems, various kinds of compensation circuits and methods have been proposed.

FIG. 1 shows the quadrature gain and phase imbalance correction circuitry of a receiver disclosed in U.S. Patent Application No. 285151. FIG. 1 illustrates a communications device 110 suitable for receiving and correcting I and Q (In phase and Quadrature phase) signals. There are two essential parts to the device 110, the path of the received signals and the signal path of the signals used to mix with the received signals. The received signal path includes a low noise amplifier 111, two mixers 112 and 113, two coupling capacitors 114 and 115 and two filters 116 and 117. Finally the signal path contains gain amplifiers 118 and 119 before the received signal is input into A/D converters 120 and 121 for processing by the digital signal processor 122. The mixing signals are produced using local oscillators 123 and 124, a phase locked loop 125, a filter 126, a phase shifter 127 and a mixer 128.

In the received signal path, the LNA (111) is a standard low noise amplifier commonly used to amplify low power high frequency RF signals. The incoming radio signal LNA comes from an antenna (not shown). The received signal will be broken into quadrature components by using mixing circuits M1 (112) and M2 (113) and phase adjusting circuit P1 (129). The outputs of M1 and M2 will become the baseband signals. For example, if the incoming signal has a bandwidth of 20 MHz, each of the I and Q branches will be signals of 10 MHz bandwidth respectively. As is conventional in quadrature circuits, capacitors C1 and C2 (114 and 115) are used to block any DC components of the received signal and filters F1 and F2 (116 and 117) are used to further filter unwanted signals. Before any I/Q modulation is performed however, it is critical that the receiver be properly calibrated.

In order to produce a reliable calibration tone in the mixing signal path, the local oscillator L1 (123) is mixed with a low frequency tone produced by L2 (124). An example of these frequencies would be L1 set at 5 Gigahertz, while L2 is set at 5 Megahertz. The local oscillator L1 is also used with a Phase Locked Loop PLL (125) and a filter F3 (126). These two signals are multiplied by a mixing circuit M4 (128). The resulting multiplication of two sine waves of differing frequencies results in two signals being produced, wherein the resulting sine wave are at different frequencies. Therefore the mixer M4 produces two signals for the calibration process.

The two calibration tones will be fed into Mixers M1 and M2 for quadrature processing. The In-phase branch would be a clear signal but the Quadrature phase would be zero. In order to overcome this problem, a Phase Shifter P2 is implemented. The phase shifter P2 adds an angle theta to the frequency of a calibration tone signal. For example, when P2 is set to zero, VI(t) is cos (wt) and VQ(t) is zero. When P2 is set to 90 degrees, the VI(t) signal is nonexistent while VQ(t) is cos (wt).

The calibration process using Phase Shifter P2 (127) would then be as follows. P2 is adjusted so as to obtain the maximum value of signal in the VI(t) branch. The adjustment of P2 is performed by the Digital Signal Processing chip (122). The maximum signal level is measured by baseband processor chip 122 and stored. Then P2 is adjusted by 90 degrees until the signal in the Q branch is at a maximum level. The maximum level of the Q branch is also measured and stored in the baseband processor chip 122. Once these maximum values of each branch are known, the baseband processor chip may perform a gain imbalance calibration. This gain imbalance correction may be performed by amplifiers G1 and G2 (118 and 119) or after analogue to digital signal conversion (A/D) in the baseband processor chip 122. It is noted that G1 and G2 may perform the gain adjustments for the receiver as a whole. It is also noted that G1 and G2 are controlled together as opposed to separately. The I and Q gains are therefore made equal to avoid any sideband production and distortion of the desired signal. The present invention also allows for gain imbalance calibration to be performed at any level of gain as set by G1 and G2.

With respect to the IQ phase error calibration, P2 would be set at an angle such as 45 degrees. This ensures a signal of almost equal value in both the I and Q branches. By simply multiplying the two signals one can detect the relative phase of the I and Q branches. The product of a sine and cosine signal should result in zero. Mixer circuit M3 (31) accomplishes the multiplication of the I and Q signals and outputs a signal to the filter F4 (30). If this is not the case, meaning that the I and Q branches are not exactly 90 degrees out of phase as desired, a phase error signal is produced. This signal is fed back through an amplifier and filter EF to Phase Shifter P1 to compensate for the error. Ideally the phase difference between the I and Q branches should be 90 degrees. Therefore, the adjustment of P2 with the appropriate gain control in addition with the adjustment of P1, allow for an optimum phase imbalance to be achieved. It is noted that P1 may be in the RF path instead of being in the local oscillator path if desired.

U.S. Pat. No. 6,122,325 also discloses a method for detecting and correcting in-phase/quadrature imbalance in digital communication receivers. The method includes the steps of assuming that a signal imbalance exists in the received signal, the signal imbalance having an amplitude imbalance and a phase imbalance, generating an amplitude imbalance correction factor and a phase imbalance correction factor to lessen the signal imbalance, and re-evaluating the amplitude and phase imbalance correction factors over a set of readings of the in-phase and quadrature components until the signal imbalance is minimized.

U.S. Pat. No. 5,949,821 discloses an apparatus for correcting phase and gain imbalance between in-phase and quadrature components of a received signal based on a determination of peak amplitudes. As shown in FIG. 2, it includes an equalizer 226 for correcting imbalance between in-phase and quadrature components of a received signal. The equalizer 226 determines peak amplitude for the in-phase and quadrature components, and the phase imbalance between both components. At least one of the in-phase and quadrature components is adjusted based on a function of the phase imbalance, and of the ratio of peak amplitudes of the in-phase and quadrature components.

Although there are already many kinds of compensation circuits and methods, it is still a goal of research to propose newer and better solutions to the I/Q mismatch problem in OFDM systems.

SUMMARY OF THE INVENTION

The object of the present invention is to provide a new method and apparatus for I/Q mismatch calibration of a receiver.

The present invention provides a method for I/Q mismatch calibration in a receiver. The receiver has an I/Q correction module using parameters $A_p$ and $B_p$. The method comprises the steps of generating an analog test signal x(t), applying I/Q demodulation to reduce the central frequency of the signal x(t) by $f_c$ Hz and outputting a demodulated signal $x_{dem}(t)$, converting the analog signal $x_{dem}(t)$ to a digital signal $x_{dem}[n]$, sending the signal $x_{dem}[n]$ into the I/Q correction module using parameters $A_p$ and $B_p$ and outputting a corrected signal w[n], obtaining two measures $U_1$ and $U_2$ of the corrected signal w[n], and updating the parameters $A_p$ and $B_p$ of the I/Q correction module respectively by a first and second function of the two measures $U_1$ and $U_2$, and the current values of the parameters $A_p$ and $B_p$.

The present invention further provides an apparatus for I/Q mismatch calibration of a receiver. The apparatus comprises a signal generator generating an analog test signal x(t), a demodulator applying I/Q demodulation to reduce the central frequency of the signal x(t) by $f_c$ Hz and outputting a demodulated signal $x_{dem}(t)$, A/D converters converting the analog signal $x_{dem}(t)$ to a digital signal $x_{dem}[n]$, an I/Q correction module using parameters $A_p$ and $B_p$ to compensate I/Q mismatch in the signal $x_{dem}[n]$ and outputting a corrected signal w[n], a dual-tone correlator outputting two measures $U_1$ and $U_2$ of the corrected signal w[n], and a processor implementing the step of updating the parameters $A_p$ and $B_p$ of the I/Q correction module respectively by a first and second function of the two measures $U_1$ and $U_2$, and the current values of the parameters $A_p$ and $B_p$.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
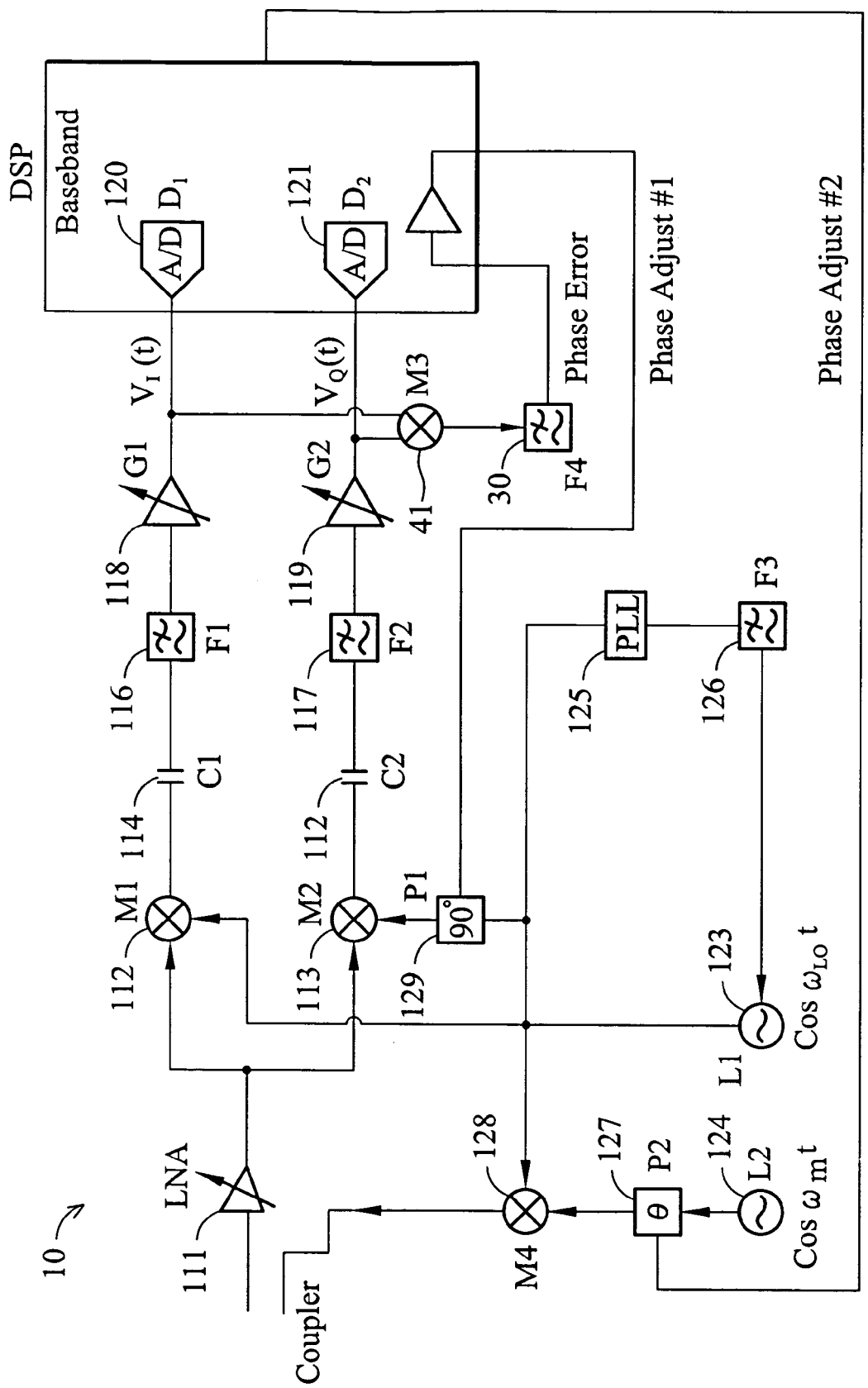
FIG. 1 shows a quadrature gain and phase imbalance correction circuitry of a receiver disclosed in U.S. Patent Application No. 285151.
Figure 2:
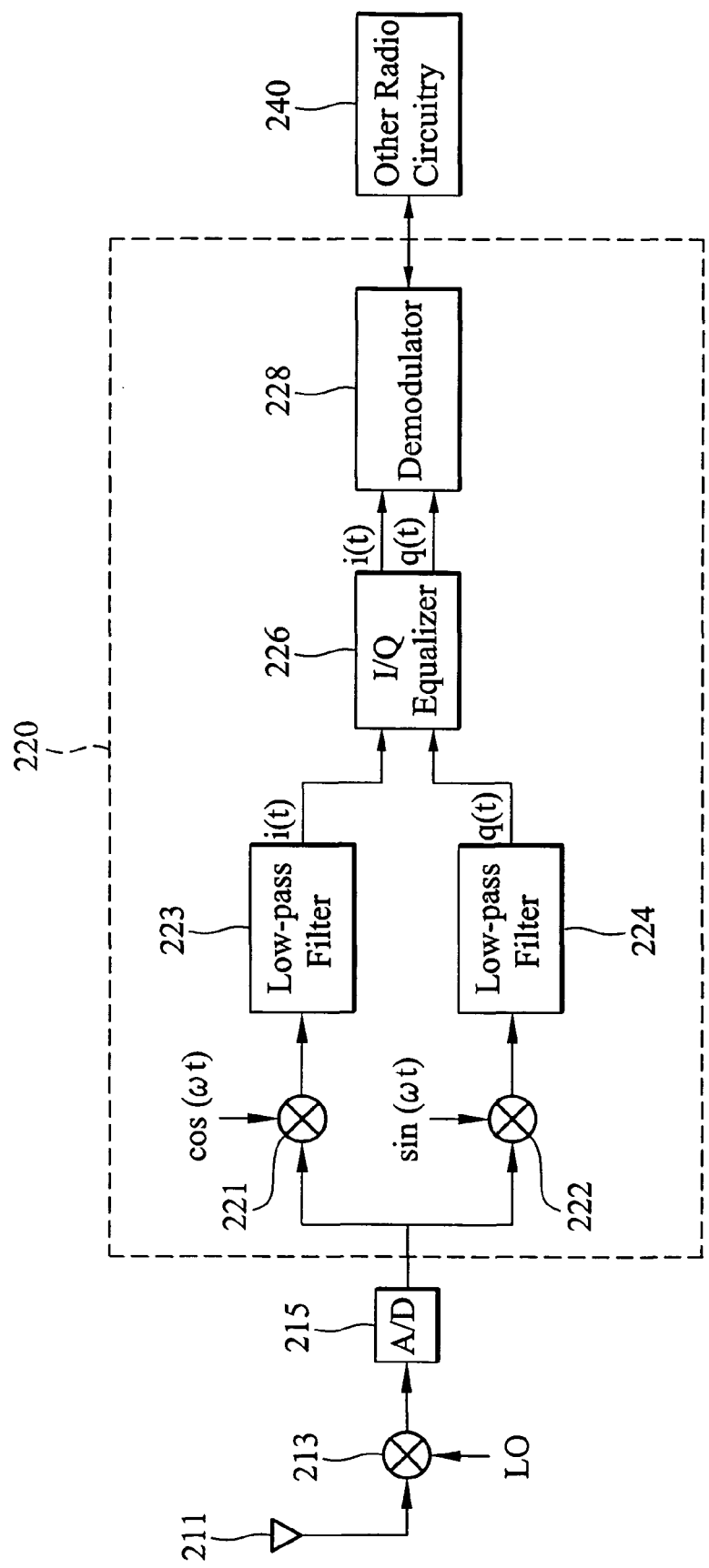
FIG. 2 shows an apparatus for correcting phase and gain imbalance between in-phase and quadrature components of a received signal based on a determination of peak amplitudes disclosed in U.S. Pat. No. 5,949,821.

The mathematical theories of the invention will be described in the following.

The baseband signals for the I and Q channels before the I/Q demodulation are represented as $x_I(t)$ and $x_Q(t)$ respectively. Ideally, the received signal can be expressed as $$r(t) = x_I(t) \cdot \cos(2\pi f_c t) - x_Q(t) \cdot \sin(2\pi f_c t) \quad (7)$$
$$= \mathrm{Re}\{x(t) \cdot e^{j2\pi f_c t}\}$$

where $x(t)=x_I(t)+jx_Q(t)$. Assuming that an amplitude mismatch a and a phase mismatch θ results from the I/Q demodulation, the baseband signals $y_I(t)$ and $y_Q(t)$ for the I and Q channels after the I/Q demodulation are, without loss of generality, given by the equations:

$$y_I(t)=x_I(t)\cdot(1+\alpha)\cdot\cos(\theta/2)+x_Q(t)\cdot(1+\alpha)\cdot\sin(\theta/2) y_Q(t)=x_I(t)\cdot(1-\alpha)\cdot\sin(\theta/2)+x_Q(t)\cdot(1-\alpha)\cdot\cos(\theta/2) \quad (8)$$

The combined baseband signal y(t) after the I/Q demodulation can be expressed as $y_I(t)+jy_Q(t)$. Thus, from the equation (8), the following equation can be derived:

$$y(t)=A\cdot x(t)+B\cdot x^*(t) \quad (9)$$

where A and B are complex numbers with $$A = \frac{1}{2}\{(1+\alpha)e^{-j\theta/2} + (1-\alpha)e^{j\theta/2}\} \quad (10)$$

$$B = \frac{1}{2}\{(1+\alpha)e^{j\theta/2} - (1-\alpha)e^{-j\theta/2}\}$$

For receiver I/Q mismatch compensation, we may compensate the signal after the A/D conversion. Let y[n] be the sampled signal of y(t) and w[n]=D(y[n]) be the compensated output. The compensation equation may be $$w[n]=A_p y[n]+B_p y^*[n] \quad (11)$$

Ideally, after the compensation, w[n]=C·x[n] where C is a constant. By substituting y[n]=A·x[n]+B·x*[n] into the equation (11), we derive:

$$w[n]=(A_p\cdot A+B_p\cdot B^*)\cdot x[n]+(A_p\cdot B+B_p\cdot A^*)\cdot x^*[n] \quad (12)$$

Accordingly, the equation w[n]=C·x[n] is satisfied only if $$A_p\cdot B+B_p\cdot A^*=0. \quad (13)$$

Therefore, the goal of the calibration method in the invention is the identification of the coefficients $A_p$ and $B_p$ which satisfy equation (13).

The I/Q mismatch should be measured over the pass band frequency range (e.g., over 0 to 8 MHz). We consider the estimation of the gain mismatch over a specific frequency $f_T$=2.5 MHz, i.e., at subchannels K=8, for the 802.11a OFDM system. Let $f_c$ be the carrier frequency. A single-tone test signal should be generated at frequency $f_c+f_T$.

Figure 3:
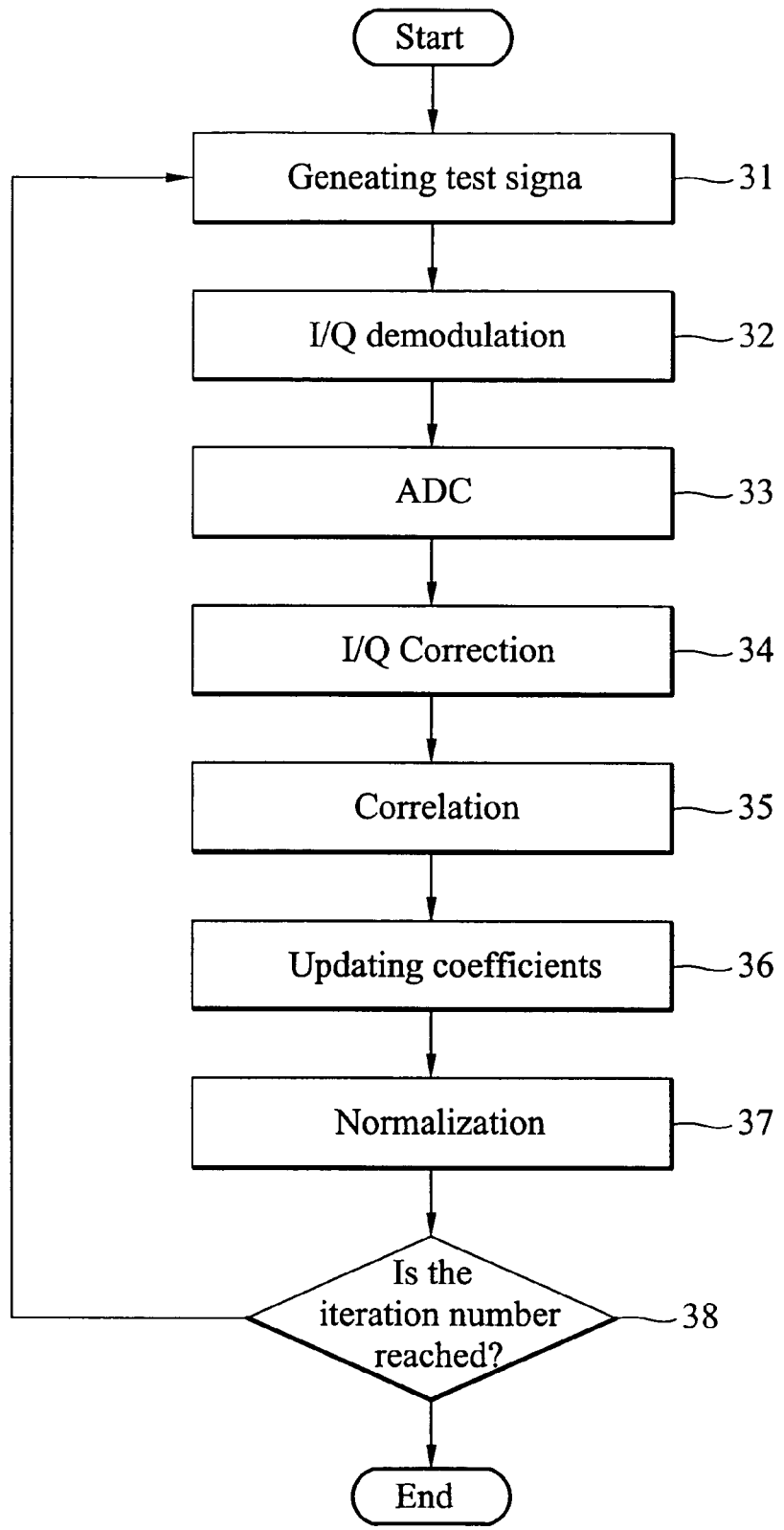
FIG. 3 is a flowchart of a method for I/Q mismatch calibration of a receiver according to one embodiment of the invention.

FIG. 3 is a flowchart of a method for I/Q mismatch calibration of an OFDM receiver according to one embodiment of the invention. The method is applied a receiver having an I/Q correction module using parameters $A_p$ and $B_p$. The calibration procedure of the invention will be specifically described in the following.

In step 31, an analog test signal x(t) is generated. The signal x(t) may be a single-tone waveform, wherein $$x(t)=\cos(2\pi(f_c+f_T)t) \quad (14)$$

In step 32, I/Q demodulation is applied to reduce the central frequency of the signal x(t) by $f_c$ Hz and output a demodulated signal $x_{dem}(t)$.

In step 33, the analog signal $x_{dem}(t)$ is converted to a digital signal $x_{dem}[n]$ with sampling rate $f_s$.

In step 34, the signal $x_{dem}[n]$ is sent into the I/Q correction module using parameters $A_p$ and $B_p$ and accordingly, the I/Q correction module outputs a corrected signal w[n]. The I/Q correction module implements a function:

$$w[n]=A_p\cdot x_{dem}[n]+B_p\cdot x^*_{dem}[n] \quad (15)$$

In step 35, two measures $U_1$ and $U_2$ of the corrected signal w[n] are obtained. The measures $U_1$ and $U_2$ are respectively:

$$U_1 = \frac{1}{M}\sum_{n=0}^{M-1} w[n]\cdot e^{-j2\pi\frac{K}{M}n} \text{ and}$$

$$U_2 = \frac{1}{M}\sum_{n=0}^{M} w[n]\cdot e^{j2\pi\frac{K}{M}n}$$

where K and M are predetermined integers such that $K/M=f_T/f_s$.

In step 36, the parameters $A_p$ and $B_p$ of the I/Q correction module are iteratively updated respectively by functions of the two measures $U_1$ and $U_2$, and the current values of the parameters $A_p$ and $B_p$. The functions are $$A'_p=A_p-\mu\cdot B^*_p\cdot U_1\cdot U_2; \text{ and}$$

$$B'_p=B_p-\mu\cdot A^*_p\cdot U_1\cdot U_2,$$

where $A'_p$ and $B'_p$ are the updated values, $A_p$ and $B_p$ are the current values, and μ is a preset step size parameter.

In step 37, the updated parameters $A_p$ and $B_p$ are normalized so that the power of the corrected signal w[n] is the same as that of the digital signal $x_{dem}[n]$.

In step 38, it is determined whether a preset iteration number H is reached. If the coefficients $A_p$ and $B_p$ are iteratively updated more than H times, the procedure is terminated; otherwise, the procedure goes to step 31 for another iteration.

The previously described method can be applied to a transceiver module, e.g., an IEEE 802.11 compliant wireless LAN transceiver module, involving I/Q demodulation. Wireless LANs based on the IEEE 802.11 standard have achieved wide customer acceptance in the enterprise environment. They are expected to continue to expand in popularity and become ubiquitous communication systems even in private and public places. Prior to the circuit for I/Q mismatch calibration in the present invention, the basics of the IEEE 802.11 wireless LAN physical layer will be described first in the following.

Originally, the 802.11 standard was written for 1 Mb/s and 2 Mb/s data rates in the 2.4 GHz–2.5 GHz ISM band, possibly using direct sequence code division multiplexing in combination with DBPSK and DQPSK modulation, respectively. An eleven-chip long Barker sequence provides processing gain, which relaxes the SNR to below 0 dB. The channel bandwidth of 14 MHz placed anywhere in the band on a 5 MHz grid allows network configurations with 3–4 access points in close physical proximity. The maximum RF transmitting power is 30 dBm.

The 802.11b standard option enhances the wireless LAN data rate to a maximum of 11 Mb/s by Complementary Code Keying (CCK) modulation. While still using the same chip rate in order not to change the RF signal bandwidth, a much-reduced processing gain accommodates the higher data rate to the expense of approximately 10 dB higher SNR requirements. Practically, at 11 Mb/s CCK is equivalent in almost all respects to regular DQPSK.

The recent advances in RFIC and radio system technologies have provided ample opportunities for the realization of miniaturized and economically viable wireless LAN transceivers. Typically, these blocks are implemented using a few ICs and several hundred passives (mostly by-pass capacitors), packaged tightly into small modules such as PCMCIA cards. Usually the cost of such modules is well within the consumer electronics market demands.

Focusing on the physical layer, notice that a radio chip and a base-band chip are typically used with analog I/Q transmit and receive interfaces. The base-band chip is mostly a digital circuit, containing only data converters. This system partitioning minimizes the digital switching noise coupling into the radio sections and provides low power chip-to-chip analog interfaces. The radio chip may be designed by different technologies such as Si bipolar, SiGe BiCMOS, or recently, even in straight CMOS. Typically, a −75 dBm sensitivity is accomplished for about 200 mW receiver power dissipation. The radio architecture has evolved from a conservative super-heterodyne approach to less expensive direct down/up conversion. The efficiency of the linear power amplifier is limited by the signal peak-to-average ratio, which is moderate, allowing reasonable transmitter power dissipation, typically 500 mW.

Using the standard, one can derive the basic transceiver specifications. The following approximate calculations are not intended to give precise design values but rather to indicate the rough figures for 802.11a radio systems.

The signal to noise-plus-distortion ratio (SNR) at the receiver A/D output is the primary overall design requirement. Starting with the −174 dBm/Hz background thermal noise and adding 73 dB corresponding to the 20 MHz channel bandwidth we obtain −101 dBm for the antenna noise. Subtracting this number from the required −65 dBm receiver sensitivity (minimum antenna signal), we calculate an input SNR of 36 dB. Since the standard assumes a 15 dB noise figure (NF) receiver, everything else being ideal, 21 dB SNR results at the output of the receiver A/D converter. This is a static channel calculation, assuming no fading and not taking into account the SNR loss in the base-band processing due to many error sources.

If fading is present, the previous calculation is amended by about a 5 dB "channel correction factor", as it can be simulated for a 54 Mb/s with 50 ns RMS delay spread. The required SNR at the output of the A/D converter jumps to approximately 26 dB. Furthermore, transmitter and receiver practical errors are usually responsible for at least 3–4 dB performance deterioration so a final 30 dB SNR is estimated. Referring this number back to the original SNR calculation and assuming the same −65 dBm sensitivity, we see that a practical receiver will have a NF less than 7 dB. Notice that the only ways the design methodology can make a difference in the transceiver performance are by minimizing the receiver NF and the various practical errors mentioned previously. For this reason it is instructive to identify these errors and the circuit blocks where they are produced.

The "transmitter implementation noise" is dependent on the signal level and it is caused by the transmitter non-idealities such as phase noise, limited power amplifier (PA) back-off, finite linearity of the transmit chain, and truncation error. The maximum transmitter implementation noise is given in the standard through the Error Vector Magnitude (EVM) specification. The "receiver thermal noise" is independent of the signal and is given by the NF. The "receiver implementation noise" is signal dependent and is produced by many non-idealities such as local oscillator noise, non-linearity in receiver chain, I/Q imbalances, DC offsets, A/D converter quantization noise, residual adjacent channels or blockers due to insufficient filtering, etc. We see that a large number of negative factors produce errors, which can easily add up to many SNR dB losses.

Figure 4:
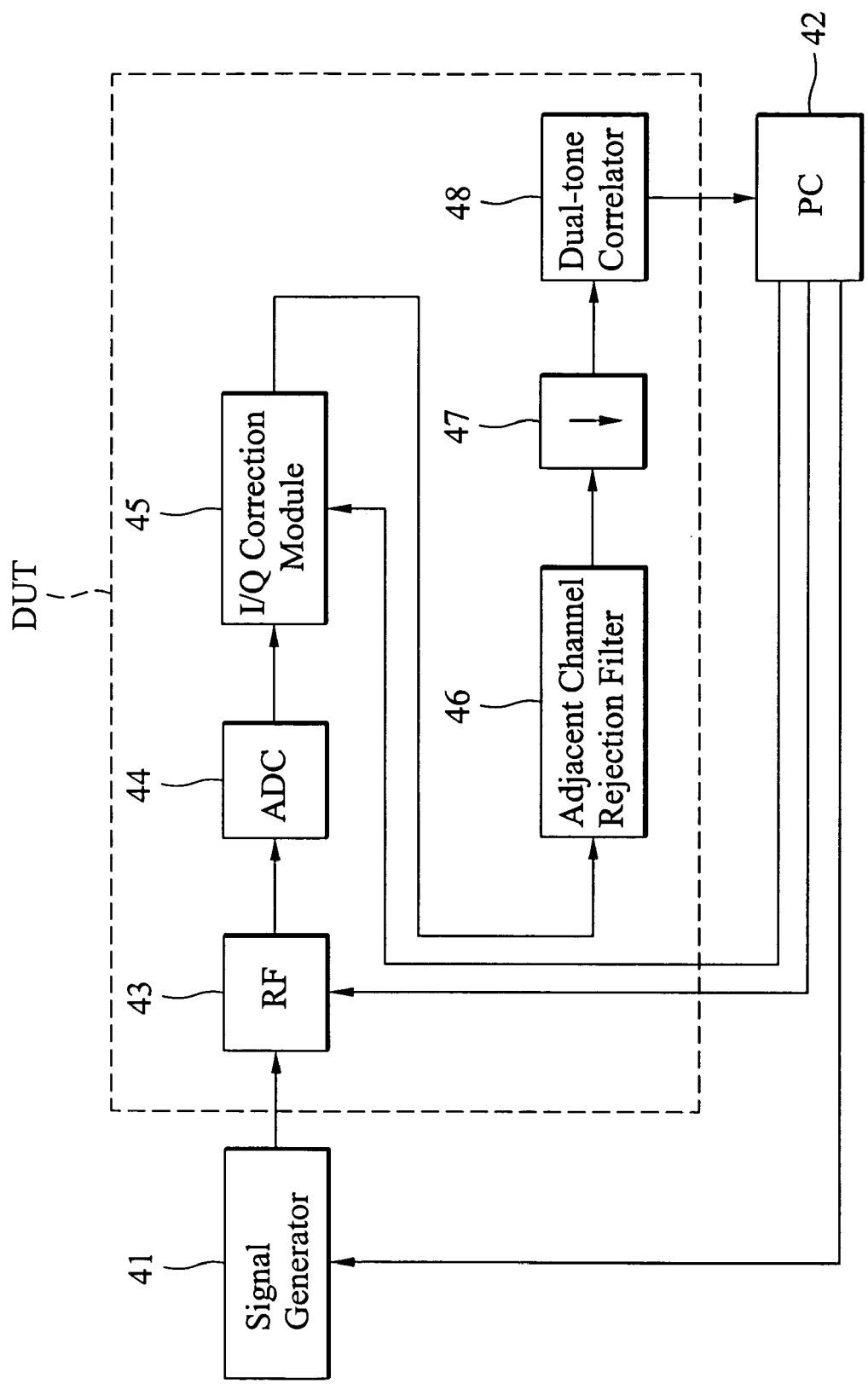
FIG. 4 shows a setup configuration for I/Q mismatch calibration according to one embodiment of the invention.

FIG. 4 shows the circuit for I/Q mismatch calibration used in the previously described IEEE 802.11 compliant wireless LAN transceiver module according to one embodiment of the invention, wherein the transmitter portion is omitted for sake of clarity.

A signal generator 41 generates a test signal x(t) which may be a single-tone waveform which can be expressed as $\cos(2\pi(f_c+f_T)t)$. The frequency and the power of the single-tone waveform are under the control of a personal computer 42. This waveform is fed into the DUT (device under test). The RF section 43 of the DUT down-converts the test signal x(t) to the baseband signal $x_{dem}(t)$. This baseband signal $x_{dem}(t)$ is sampled by the analog-to-digital converter 44 with a sampling rate of 40 MHz and is converted to a digital signal $x_{dem}[n]$. The I/Q correction module 45 corrects the I/Q mismatch in the signal outputted from the ADC 44 by a function $w[n]=A_p \cdot x_{dem}[n]+B_p \cdot x^*_{dem}[n]$, where w[n] is the corrected signal, $x_{dem}[n]$ is the signal from the ADC 44, and $A_p$ and $B_p$ are correction coefficients. The dual-tone correlator 48 performs Fourier transformation of w[n] and outputs two measures $U_1$ and $U_2$, where $$U_1 = \frac{1}{M} \sum_{n=0}^{M-1} w[n] \cdot e^{-j2\pi \frac{K}{M} n} \text{ and } U_2 = \frac{1}{M} \sum_{n=0}^{M} w[n] \cdot e^{j2\pi \frac{K}{M} n}.$$

The two measures $U_1$ and $U_2$ are read by the personal computer 42 for implementation of the following functions to update the coefficients $A_p$ and $B_p$:

$$A'_p = A_p - \mu \cdot B^*_p \cdot U_1 \cdot U_2 \text{ and}$$

$$B'_p = B_p - \mu \cdot A^*_p \cdot U_1 \cdot U_2,$$

where $A'_p$ and $B'_p$ are the updated values, $A_p$ and $B_p$ are the current values, and μ is a preset step size parameter. The updated coefficients are fed back to the I/Q correction module 45.

The personal computer 42 iteratively updates the coefficients $A_p$ and $B_p$ until a preset iteration number H is reached.

Additionally, the updated coefficients $A_p$ and $B_p$ may be normalized so that the power of the corrected signal w[n] is the same as that of the digital signal $x_{dem}[n]$.

In conclusion, the present invention provides a new method and apparatus for receiver I/Q mismatch calibration, especially suitable for an IEEE 802.11 compliant WLAN transceiver module. The compensation of the I/Q mismatch is achieved by an I/Q correction module prior to the I/Q demodulator. The coefficients of the I/Q correction module is determined by an iterative algorithm. After a properly selected number of iterations, the coefficients are accurate enough for the received signal to be free from the I/Q mismatch.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for I/Q mismatch calibration in a receiver having an I/Q correction module using parameters $A_p$ and $B_p$, the method comprising the steps of:

generating an analog test signal x(t) containing $\cos(2\pi(f_c+f_T)t)$, where $f_c$ and $f_T$ are predetermined real numbers;

applying I/Q demodulation to reduce the central frequency of the signal x(t) by $f_c$ Hz and outputting a demodulated signal $x_{dem}(t)$;

converting the analog signal $x_{dem}(t)$ to a digital signal $x_{dem}[n]$ with a preset sampling rate of $f_s$ Hz;

sending the signal $x_{dem}[n]$ into the I/Q correction module using parameters $A_p$ and $B_p$ and outputting a corrected signal w[n];

obtaining two measures $U_1$ and $U_2$ of the corrected signal w[n] where $U_1$ and $U_2$ are values indicative of the discrete-Fourier transform of w[n] corresponding to frequency $+f_T$ Hz and $-f_T$ Hz, respectively; and updating the parameters $A_p$ and $B_p$ of the I/Q correction module respectively by a first and second function of the two measures $U_1$ and $U_2$, and the current values of the parameters $A_p$ and $B_p$; wherein the initial values of $A_p$ and $B_p$ are nonzero numbers.

2. The method claimed in claim 1, wherein the I/Q correction module implements a function:

$$w[n]=A_p\cdot x_{dem}[n]+B_p\cdot x^*_{dem}[n],$$

where the superscript * refers to a complex conjugate.

3. The method claimed in claim 1, wherein the first and second function are respectively:

$$A'_p=A_p-\mu\cdot B^*_p\cdot U_1\cdot U_2; \text{ and}$$

$$B'_p=B_p-\mu\cdot A^*_p\cdot U_1\cdot U_2,$$

where $A'_p$ and $B'_p$ are the updated values, $A_p$ and $B_p$ are the current values, and μ is a step size parameter.

4. The method claimed in claim 1, wherein:

$$f_T=\frac{K}{M}f_s,$$

where K and M are integers and the measures $U_1$ and $U_2$ are respectively obtained by:

$$U_1=\frac{1}{M}\sum_{n=0}^{M-1}w[n]\cdot e^{-j2\pi\frac{K}{M}n}; \text{ and}$$

$$U_2=\frac{1}{M}\sum_{n=0}^{M}w[n]\cdot e^{j2\pi\frac{K}{M}n}.$$

5. The method claimed in claim 1 further comprising the step of:

normalizing the updated parameters $A_p$ and $B_p$ so that the power of the corrected signal w[n] is the same as that of the digital signal $x_{dem}[n]$.

6. An apparatus for I/Q mismatch calibration of a receiver, comprising:

a signal generator generating an analog test signal x(t) containing $\cos(2\pi(f_c+f_T)t)$, where $f_c$ and $f_T$ are predetermined real numbers;

a demodulator applying I/Q demodulation to reduce the central frequency of the signal x(t) by $f_c$ Hz and outputting a demodulated signal $x_{dem}(t)$;

A/D converters converting the analog signal $x_{dem}(t)$ to a digital signal $x_{dem}[n]$ with a preset sampling rate of $f_s$ Hz;

an I/Q correction module using parameters $A_p$ and $B_p$ to compensate I/Q mismatch in the signal $x_{dem}[n]$ and outputting a corrected signal w[ ];

a dual-tone correlator outputting two measures $U_1$ and $U_2$ of the corrected signal w[n] where $U_1$ and $U_2$ are values indicative of the discrete-Fourier transform of w[n] corresponding to frequency $+f_T$ Hz and $-f_T$ Hz, respectively; and a processor implementing the step of:
providing the parameters $A_p$ and $B_p$ with nonzero initial values; and
updating the parameters $A_p$ and $B_p$ respectively by a first and second function of the two measures $U_1$ and $U_2$, and the current values of the parameters $A_p$ and $B_p$.

7. The apparatus as claimed in claim 6, wherein the processor further implements the step of:

normalizing the updated parameters $A_p$ and $B_p$ so that the power of the corrected signal w[n] is the same as that of the digital signal $x_{dem}[n]$.

8. The apparatus as claimed in claim 6, wherein the first and second function are respectively:

$$A'_p=A_p-\mu\cdot B^*_p\cdot U_1\cdot U_2; \text{ and}$$

$$B'_p=B_p-\mu\cdot A^*_p\cdot U_1\cdot U_2,$$

where $A'_p$ and $B'_p$ are the updated values, $A_p$ and $B_p$ are the current values, and μ is a preset step size parameter.

9. The apparatus as claimed in claim 6, wherein the I/Q correction module implements a function:

$$w[n]=A_p\cdot x_{dem}[n]+B_p\cdot x^*_{dem}[n],$$

where the superscript * refers to a complex conjugate.

10. The apparatus as claimed in claim 6, wherein:

$$f_T=\frac{K}{M}f_s,$$

where K and M are integers and the measures $U_1$ and $U_2$ are respectively obtained by:

$$U_1=\frac{1}{M}\sum_{n=0}^{M-1}w[n]\cdot e^{-j2\pi\frac{K}{M}n}; \text{ and}$$

$$U_2=\frac{1}{M}\sum_{n=0}^{M}w[n]\cdot e^{j2\pi\frac{K}{M}n}.$$

* * * * *